United States Patent
Kunimitsu et al.

[11] Patent Number: 5,850,819
[45] Date of Patent: Dec. 22, 1998

[54] FUEL EVAPORATIVE EMISSION TREATMENT SYSTEM

[75] Inventors: Masafumi Kunimitsu; Kiyoshi Mori; Tomokazu Muraguchi, all of Okazaki; Yoichiro Ando, Seto; Yasuo Kimura, Okazaki, all of Japan

[73] Assignee: Mitsubishi Jidosha Kogyo Kabushiki Kaisha, Tokyo, Japan

[21] Appl. No.: 569,994

[22] Filed: Dec. 8, 1995

[30] Foreign Application Priority Data

Dec. 9, 1994 [JP] Japan .................................. 6-306743
Aug. 24, 1995 [JP] Japan .................................. 7-215819

[51] Int. Cl.$^6$ .................................................. F02M 37/04
[52] U.S. Cl. .................................... 123/520; 123/516
[58] Field of Search ................................. 123/520, 516, 123/519, 521, 518, 198 D

[56] References Cited

U.S. PATENT DOCUMENTS

| | | | |
|---|---|---|---|
| 4,651,889 | 3/1987 | Uranshi | 123/519 |
| 4,809,865 | 3/1989 | Mori | 123/519 |
| 4,862,856 | 9/1989 | Yokoe | 123/520 |
| 4,887,578 | 12/1989 | Woodcock | 123/520 |
| 5,067,468 | 11/1991 | Otowa | 123/520 |
| 5,103,877 | 4/1992 | Sherwood | 123/519 |
| 5,209,210 | 5/1993 | Ikeda | 123/520 |
| 5,501,198 | 3/1996 | Koyama | 123/520 |
| 5,647,332 | 7/1997 | Hyodo | 123/520 |
| 5,647,333 | 7/1997 | Mukai | 123/520 |

FOREIGN PATENT DOCUMENTS

| | | |
|---|---|---|
| 3-1256 | 1/1991 | Japan . |
| 4-505491 | 9/1992 | Japan . |
| 5-34513 | 5/1993 | Japan . |

*Primary Examiner*—Carl S. Miller

[57] ABSTRACT

A fuel evaporative emission treatment system includes a canister which has an evaporative fuel introduction part arranged for communication with a fuel tank, an evaporative fuel emission part arranged for communication with an intake system of an engine, and a vent part arranged for communication with the atmosphere, and which absorbs the evaporative fuel. The fuel evaporative emission treatment system includes a vent pipe having a first passage communicating to the vent part of the canister and to the atmosphere, a first solenoid valve for opening and closing the first passage, an air filter for cleaning atmospheric air flowing thereinto, the filter being provided on the first passage on the side remote from the canister with respect to the first solenoid valve, and a one-way valve or lead valve which defines a second passage communicating to the vent part of the canister. The valve is opened at fueling. The evaporative fuel generated in the fuel tank upon fueling contains a fuel component which is eliminated by the canister and emitted into the atmosphere through the second passage. As a result, the fueling performance will not deteriorate even if the air filter is provided.

16 Claims, 12 Drawing Sheets

F I G. 6
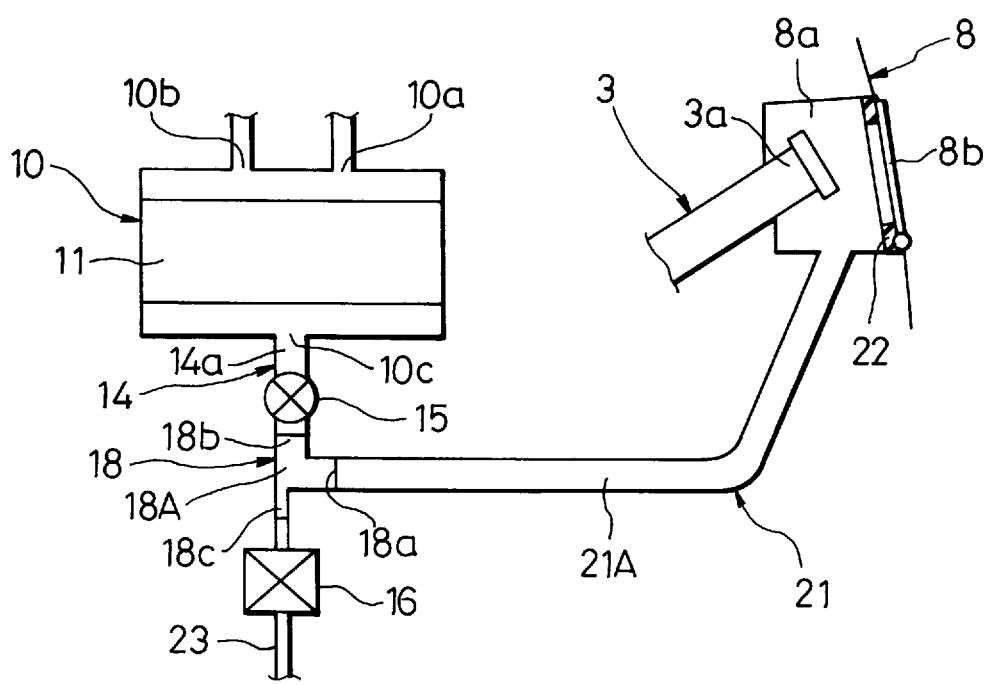

FUEL EVAPORATIVE EMISSION TREATMENT SYSTEM

BACKGROUND OF THE INVENTION

1. Field of the Invention

This invention relates to a fuel evaporative emission treatment system which prevents emission of evaporative fuel into the atmosphere.

2. Description of the Related Art

Evaporation of gasoline fuel in a fuel tank generates gasoline vapor (hereinafter referred to as "evaporative fuel") in the fuel tank. Particularly, during parking in the daytime, the fuel tank temperature is raised to increase the evaporative fuel pressure, so that evaporative fuel is easily emitted into the atmosphere. Upon fueling for which a filler port of a filler neck in the fuel tank is opened, evaporative fuel is emitted from the filler port into the atmosphere. In this regard, a vehicle is generally provided with a fuel evaporative emission treatment system to prevent emission of evaporative fuel into the atmosphere.

The fuel evaporative emission treatment system is provided with a canister filled with absorbent (activated charcoal). A fuel component (HC (hydrocarbon)) in evaporative fuel is eliminated by introducing the evaporative fuel from the fuel tank into the canister through a vent hose and by having the fuel component in the evaporative fuel absorbed by the absorbent. Gas (air) which does not contain fuel components is emitted from the vent port of the canister into the atmosphere.

During operation of an engine, the fuel evaporative emission treatment system introduces negative pressure from an intake manifold into the canister, to thereby take atmospheric air (purge air) into the canister from the vent port of the canister. The fuel component having been absorbed by the absorbent is removed (purged) from the absorbent by the purge air. The purge air and the removed fuel are led into a combustion chamber of the engine through a purge pipe, to be burned with fuel mixture. Thus, emission of evaporative fuel into the atmosphere is prevented. When fuel component is purged, absorption capability of the absorbent is recovered.

In the case that a large amount of evaporative fuel is generated and the evaporative fuel exceeding the absorption capability of the canister flows into the canister, the evaporative fuel is emitted into the atmosphere. In order to prevent this, the system disclosed in Japanese Provisional Utility Model Publication No. 3-1256 has a valve provided at the vent port of the canister and responsive to internal pressure of the fuel tank. When the inside of the fuel tank reaches a prescribed positive pressure, the above-mentioned valve is closed to close the vent port of the canister, to thereby prevent emission of evaporative fuel, without using a large capacity canister, even if a large amount of evaporative fuel is generated.

Incidentally, a leakage of evaporative fuel might occur in a fuel system due to deterioration of components of the fuel system (in particular, a fuel vapor system including a fuel tank, a canister, etc.). Thus, a fuel evaporative emission treatment system is used, which is provided with a function to check presence of evaporative fuel leakage (more generally, failure) in a fuel system. This type of fuel evaporative emission treatment system is provided with a first on-off valve provided on a purge pipe, a second on-off valve provided on the vent port side of the canister, and a pressure sensor for detecting an internal pressure in the fuel tank. In checking evaporative fuel leakage, a negative pressure in the intake system is first introduced to a fuel vapor system by opening the first on-off valve, while the second on-off valve is closed. Then, a pressure change in the fuel vapor system after closure of the first on-off valve is detected by the pressure sensor. If the pressure is changed to a large extent, a leakage of evaporative fuel in the fuel system is detected.

In the fuel evaporative emission treatment system having such a failure diagnosing function, a large positive or negative pressure might be generated in the fuel tank when the second on-off valve is closed. To avoid this, the fuel evaporative emission treatment system disclosed in Provisional Patent Publication No. 4-505491 published in the national stage in Japan has a pressure-responsive protective valve provided on the canister side with respect to the switching valve (corresponding to the second on-off valve) for failure diagnosis which is provided on the vent port side of the canister. The fuel tank internal pressure is made proper by opening the protective valve, if necessary.

Atmospheric air flown into the second on-off valve of the fuel evaporative emission treatment system might contain mud or dust. If mud or dust adheres to a valve plug or valve seat of the second on-off valve, a slight clearance is generated between the valve plug and the valve seat even when the second on-off valve is closed. In this case, air-tightness of the fuel system at the time when the second on-off valve is closed for failure diagnosis is lowered. This induces inflow of atmospheric air, and the flown-in atmospheric air increases the internal pressure of the fuel system. Thus, even when there is no leakage in the fuel system, misdiagnosis might be made that a failure occurs in the fuel.

However, in the conventional fuel evaporative emission treatment system, there have been no measures to avoid deterioration in air-tightness of the second on-off valve caused by mud or dust contained in the purge air.

In order to eliminate mud or dust in the purge air, an air filter can be provided on the purge air inlet side of the second on-off valve, for instance. But if an air filter is simply provided, a pressure loss is increased in the flow passage from the fuel tank to the vent port of the canister through the second on-off valve and the air filter. In this case, it becomes difficult for evaporative fuel to flow into the canister from the fuel tank at fueling, so that the fueling performance is lowered.

In order to reduce a pressure loss from the fuel tank to the vent port of the canister while providing an air filter on the purge air inlet side of the second on-off valve, there are some measures such as use of a large-sized air filter, an increase in inner diameter of the vent hose which connects the fuel tank to the canister, or reduction in the length of the vent hose.

However, any empty space is scarce in a vehicle, and there is little degree of freedom in selecting the location of the air filter. Also, the larger the air filter becomes, the harder a place can be found to arrange the filter. In particular, it is difficult to find a space to provide a filter in the neighborhood of the fuel tank. If the length of the vent hose is reduced, the location of the air filter naturally comes close to the fuel tank. Because of the above-mentioned reasons, it is hard to provide a filter in the neighborhood of a fuel tank. It is also difficult to provide an air filter at a position where mud or the like would not enter from its opening on the atmosphere side.

In connection with provision of an air filter on the second on-off valve, Japanese Patent Publication No. 5-34513 discloses a system provided with a filter which is disposed on the downstream side of a solenoid valve provided at the vent port of the canister. However, this solenoid valve only responds to fueling and engine operation, and is not used for failure diagnosis for fuel evaporative emission treatment system.

The system disclosed in Provisional Patent Publication No. 4-505491 mentioned above is not provided with an air filter at the vent port of the canister, and is not intended for clarification of purge air at all. Thus, this prior art fails to suggest new problems or their solutions accompanying the provision of an air filter device at all. The protective valve of this system does not respond to fueling, and its location is limited to the upstream side of the switching valve.

SUMMARY OF THE INVENTION

An object of the present invention is to provide a fuel evaporative emission treatment system which prevents deterioration in gas-tightness of the fuel evaporative emission treatment system caused by mud or dust, by providing a filter on the vent port side of a canister for eliminating the mud or dust contained in purge air.

Another object of the present invention is to provide a fuel evaporative emission treatment system which avoids deterioration in fueling performance caused by the provision of a filter.

Still another object of the present invention is to provide a fuel evaporative emission treatment system which can reduce the size of a filter.

Still another object of the present invention is to provide a fuel evaporative emission treatment system which has a greater degree of freedom in selecting location of the filter.

According to the present invention, the fuel evaporative emission treatment system comprises a canister for absorbing evaporative fuel, the canister having an evaporative fuel introduction part arranged for communication with a fuel tank, an evaporative fuel emission part arranged for communication with an intake system of an engine, and a vent part arranged for communication with the atmosphere; a first passage forming means having a first passage with a first end communicating to the vent part and a second end communicating to the atmosphere; a first switching means for opening and closing the first passage; a filter provided in the first passage on the side remote from the canister with respect to the first switching means, for cleaning atmospheric air flowing into the filter; a second passage forming means having a second passage with a first end communicating to the vent part of the canister; and a second switching means for opening and closing the second passage.

An advantage of the present invention is that atmospheric air flowing into the first passage can be cleaned by the filter, whereby mud and dust contained in the atmospheric air flowing into the filter are prevented from entering into the first switching means. Thus, adhesion of mud and dust to the first switching means which makes the closing operation of the first switching means incomplete can be prevented. Therefore, in conducting an evaporative fuel leakage test (failure diagnosis) on the fuel vapor system, communication between an engine intake system and the canister and communication between the canister and the atmosphere can be completely shut off, so that failure diagnosis accuracy is improved.

Another advantage of the present invention is that fueling to the tank can be done smoothly. That is, the second passage communicating to the vent part of the canister is not provided with a filter, and hence the passage resistance of the second passage is smaller than the passage resistance of the first passage provided with a filter. Thus, when the second switching means is so operated as to cause the second passage to open at fueling, gas whose fuel component is eliminated by the canister is emitted to the atmosphere through the second passage, so that evaporative fuel easily flows into the canister from the fuel tank whereby deterioration of fueling performance caused by the provision of the filter can be avoided.

Still another advantage of the present invention is that it is unnecessary to increase the size of the filter or the diameter of a pipe through which evaporative fuel is introduced from the fuel system to the canister, or to reduce the length of this pipe, in order to prevent deterioration in fueling performance caused by the provision of the filter. Thus, the filter can be small in size, and the degree of freedom in selecting location of the filter becomes greater.

Preferably, the first end of the second passage communicates to the first passage between the first switching means and the filter. In this case, the second passage is connected to the vent part through the first passage. Hence, it is unnecessary to connect the second passage directly to the vent part whereby the system can be made simple in construction. Also, when the first passage is closed by the first switching means, the communication between the second passage and the canister is shut off. Therefore, in failure diagnosis of the fuel system, inflow of atmosphere to the fuel system through the second passage can be prevented by closing the first passage. That is, the provision of the second passage does not adversely affect failure diagnosis.

Alternatively, the first end of the second passage communicates to the first passage on the canister side with respect to the first switching means. In this case, at fueling, gas emitted from the canister flows into the second passage on the upstream side of the first switching means. Thus, the gas can be emitted into the atmosphere without being affected by the passage resistance of the first switching means and the passage resistance of the filter, whereby the fueling performance is improved. Even if the passage resistance of the first passage on the downstream side of the first switching means is increased, the fueling performance will not be lowered. That is, the cross section of the first passage on the downstream side of the first switching means can be made smaller, or the length of the first passage can be made longer. Therefore, the first switching means can be made smaller in size, and the degree of freedom in selecting the filter location is made greater. For example, a filter can be provided at a position where mud will not reach. Since it is unnecessary to connect the second passage directly to the vent part, the system constitution can be made simple.

Alternatively, the first end of the second passage opens into the vent part. In this case, the second passage is provided independently of the first passage to which the filter is attached. Thus, the degree of freedom in constituting the second passage (second passage forming means) is made greater. For example, the second passage can be so constructed that mud or dust will not enter from another end of the second passage.

Preferably, the second switching means is a one-way valve or lead valve which causes the second passage to open when a positive pressure is generated in the inside of the first passage or the canister upon generation of a pressure attributable to the fueling into the fuel tank. In this case, the cost of the fuel evaporative emission treatment system can be reduced.

The fuel evaporative emission treatment system may be mounted on a vehicle which has a fuel filler base with a space for accommodating a filler-port-formed portion of the filler neck of the fuel tank. In such a fuel evaporative emission treatment system, preferably, the second passage has another end which opens to the above-mentioned space of the fuel filler base. In this case, intrusion of mud or dust into the second passage can be prevented.

More preferably, the second switching means is a fuel filler lid which is provided so as to be opened and closed at the fuel filler base having a fueling gun insertion port. The fuel filler lid tightly closes the fueling gun insertion port of the fuel filler base when the fuel filler lid is closed. Alternatively, the second switching means is a lid member provided at the fuel filler lid which is provided so as to be opened and closed at the fuel filler base. The lid member tightly closes another end of the second passage when the fuel filler lid is closed. In this case, the second switching means can be constituted by components which constitute an existing fuel system, and hence the resultant constitution of the system is made simple. Also, intrusion of mud or dust into the second passage can be surely prevented.

Preferably, the second passage has another end which opens to the neighborhood of the filler port of the filler neck. More preferably, the second switching means is a filler cap which is removably attached at the filler port. The filler cap closes another end of the second passage when the filler cap is attached to the filler port. In this case, too, the second switching means can be constituted by existing fuel system constituting components, and intrusion of mud or dust into the second passage can be prevented.

Alternatively, the second switching means is a shutter for opening and closing another end of the second passage. In this case, intrusion of mud or dust into the second passage can be surely prevented. More preferably, the shutter closes another end of the second passage by being driven by the filler cap when the filler cap is attached to the filler port. In fueling to the fuel tank for which the filler cap is removed from the filler port, the shutter is driven by a valve for opening and closing the fueling gun insertion port formed at a restrictor provided at the filler port, so that another end of the second passage is opened. In this case, the second switching means can be driven by components of an existing fuel system. The resultant system is simple in construction.

Preferably, the second switching means is a solenoid valve which is energized to be opened at fueling to the fuel tank. More preferably, the fuel evaporative emission treatment system further includes a judging means for judging whether the fuel tank is being fueled or not. When the judging means makes a judgment that fueling is being done, the solenoid valve is energized. In this case, the opening and closing operation of the second switching means can be done securely.

Preferably, the fuel evaporative emission treatment system further includes a pressure detecting means for detecting the internal pressure in the system on the side remote from the filter with respect to the first switching means or the internal pressure of the fuel tank. Based on a change in the internal pressure detected by the pressure detecting means in a state where the first switching means is closed, a failure of the fuel evaporative emission treatment system or the fuel tank is judged. In this case, a failure of the fuel evaporative emission treatment system or the fuel tank, for example, evaporative fuel leakage, can be judged. In the failure diagnosis, according to the system of the present invention provided with the advantage that communication between the engine intake system and the canister and the communication between the canister and the atmosphere can be completely shut off, a failure can be judged with a high accuracy.

BRIEF DESCRIPTION OF THE DRAWINGS

FIG. 6 is a fragmentary view showing an essential part of the fuel evaporative emission treatment system according to a fourth embodiment of the present invention;

DETAILED DESCRIPTION

In the following, a fuel evaporative emission treatment system according to a first embodiment of the present invention will be explained.

Figure 1:
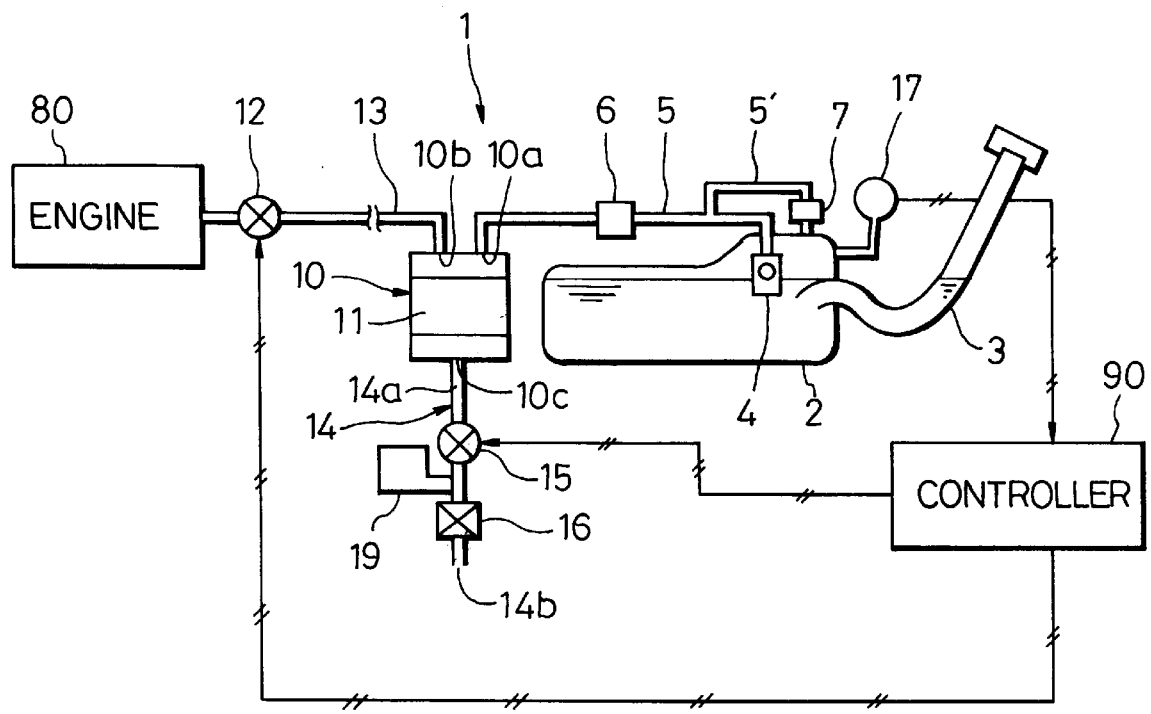
FIG. 1 is a schematic view showing a fuel evaporative emission treatment system according to a first embodiment of the present invention.
Figure 2:
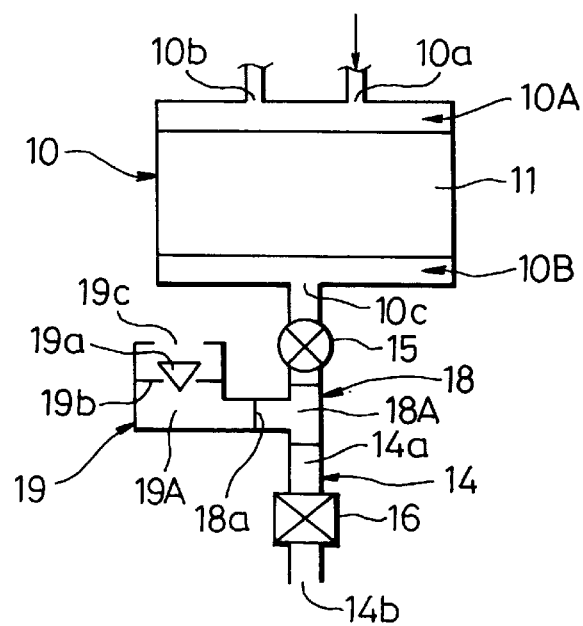
FIG. 2 is a fragmentary enlarged view showing an essential part of the system shown in FIG. 1.

As shown in FIGS. 1 and 2, a fuel evaporative emission treatment system 1 is provided with a canister 10 filled with an absorbent (activated charcoal) 11 for absorbing evaporative fuel generated in a fuel tank 2. The canister 10 has an evaporative fuel introducing and emitting part 10A defined by the upper half of its casing and the top face of the absorbent 11, and a vent part (atmospheric air introduction and gas emission part) 10B defined by the lower half of the casing and the bottom face of the absorbent 11.

The fuel introducing and emitting part 10A of the canister 10 has an evaporative fuel inlet port 10a to which one end of a vent hose 5 is connected, and an evaporative fuel outlet port 10b to which one end of a purge pipe 13 is connected. The other end of the vent hose 5 arranged in the fuel tank 2 is provided with a leveling valve 4 for preventing overfueling to the fuel tank 2. In the middle of the vent hose 5, a rollover valve 6 is provided for preventing leakage of fuel from the fuel tank 2 at rollover of the vehicle. At a branch vent hose 5' branching from the vent hose 5 between the valve 4 and the valve 6, a two-way valve 7 is provided which is opened when the internal pressure of the fuel tank 2 increases while the leveling valve 4 is closed. Moreover, the other end of the purge pipe 13 is connected to an intake manifold (intake system) of an engine 80, and a first switching valve 12 for leakage check constituted by, for example, a normally-closed on-off solenoid valve, is provided in the middle of the purge pipe 13. In FIG. 1, reference numeral 3 refers to a filler neck of the fuel tank 2.

The vent part 10B of the fuel evaporative emission treatment system 1 has a vent port 10c to which one end of a vent pipe (first passage forming means) 14 having a first passage 14a is connected, and the other end 14b of the vent pipe 14 opens into the atmosphere. Further, in the middle of the pipe 14 are provided a second switching valve (first switching means) 15 for leakage check constituted by, for example, a normally-open on-off solenoid valve, and an air filter 16 for cleaning inflow air. The filter 16 is arranged in the first passage on the side close to an opening 14b of the first passage with respect to the switching valve 15.

A three-way joint 18 is connected to the pipe 14 between the switching valve 15 and the air filter 16. To an outlet port 18a of the three-way joint 18, a one-way valve (second switching means) 19 is connected. Inside the three-way joint 18 and the one-way valve 19, flow passages (second passage) 18A and 19A with small passage resistance are formed.

The one-way valve 19 is opened when the internal pressure of the vent pipe 14 is slightly higher than the atmospheric pressure, that is, the internal pressure reaches an extremely small positive pressure. More specifically, the one-way valve 19 has a valve plug 19a constituted by a light-weight float (synthetic resin member made of plastic or the like, for example). The valve plug 19a sits on a valve seat 19b by its own weight. The one-way valve 19 has an atmospheric port 19c which opens into the atmosphere above the valve plug 19a.

Further, the fuel evaporative emission treatment system 1 has a pressure sensor 17 communicating to the fuel tank 2 for detecting the fuel tank internal pressure, and a controller 90 connected to the output sides of various sensors including the pressure sensor 17. To the controller 90, solenoids of the switching valves 12 and 15 are connected. The controller 90 has a function to check a leakage of evaporative fuel from the fuel evaporative emission treatment system 1 and from the fuel tank 2 (i.e., a function to perform failure diagnosis).

Operation of the fuel evaporative emission treatment system 1 shown in FIGS. 1 and 2 will be explained below.

In parking or fueling, the leveling valve 4, the rollover valve 6, and the switching valve 15 of the fuel evaporative emission treatment system 1 are opened, while the switching valve 12 is closed. Thus, the evaporative fuel generated in the fuel tank 2 flows into the canister 10 through the vent hose 5 and the evaporative fuel inlet port 10a of the canister 10, and is absorbed by an absorbent 11 filled in the canister 10. Gas (air) from which fuel component (HC) is eliminated by the absorbent 11 flows into the vent pipe 14 (first passage 14a) from the vent port 10c of the canister 10.

The pressure of the gas flowing into the vent pipe 14 is slightly higher than the atmospheric pressure, so that a positive pressure is formed in the inside of the vent pipe 14. The passage resistance of the air filter 16 provided in the first passage 14a on the opening end 14b side of the passage 14a with respect to the second switching valve 15 is larger than the passage resistance of the one-way valve 19 provided at the second passage 18A, 19A which is communicated to the first passage 14a between the second switching valve 15 and the air filter 16. Therefore, the gas in the first passage 14a flows from the outlet port 18a of the three-way joint 18 into the one-way valve 19. This inflow gas pushes up the light-weight float 19a of the one-way valve 19, causes the valve 19 to open, and flows out from the atmospheric port 19c of the valve 19 into the atmosphere. That is, in parking or fueling, the gas in the canister 10 is emitted into the atmosphere through the one-way valve 19 with small passage resistance. Thus, fueling performance will not deteriorate due to the provision of the air filter 16 with a large passage resistance.

During operation of the engine 80, the controller 90 of the fuel evaporative emission treatment system 1 judges, based on the sensor outputs, that the engine 80 is operating, and causes the first switching valve 12 to open. Since the normally-open second switching valve 15 is open at this time, a negative pressure in the intake manifold of the engine 80 is introduced into the canister 10 through the purge pipe 13. As a result, the internal pressures in the canister 10 and the vent pipe 14 becomes negative. In this case, the valve plug 19a of the one-way valve 19 is pressed into contact with the valve seat 19b by the atmospheric pressure, so that the valve 19 is closed. The atmosphere (purge air) flows into the air filter 16, and mud or dust contained in the inflow air is eliminated. The thus cleaned purge air flows into the canister 10 through the vent pipe 14, and the fuel component of the evaporative fuel absorbed by the absorbent 11 is purged by the purge air and is sucked into a combustion chamber of the engine 80 through the purge pipe 13, to be burned. Also, the absorption capability of the absorbent 11 is recovered by purge of the evaporative fuel, to be ready for the next absorption of evaporative fuel.

Incidentally, a hole or the like in the filler neck 3, the vent hose 5, the purge pipe 13, etc., if any, might cause an evaporative fuel leakage in the fuel vapor system (fuel system in general), which includes the fuel evaporative emission treatment system 1 and the fuel tank 2. The fuel evaporative emission treatment system of this embodiment has a failure diagnosis function to check a leakage of evaporative fuel from the fuel system. In the failure diagnosis, the controller 90 first closes the second switching valve 15.

As mentioned above, in the fuel evaporative emission treatment system of this embodiment, mud or dust contained in the purge air is eliminated by the air filter 16, to thereby prevent intrusion of mud or dust into the second switching valve 15. As a result, the closing operation of the second switching valve 15 upon failure diagnosis is not prevented by mud or dust adhering to the inside of switching valve 15, so that the switching valve 15 is fully closed. Thus, communication between the canister side of the first passage 14a and the atmosphere is completely shut off.

Next, the normally-closed first switching valve 12 is opened under the control of the controller 90, by which the intake negative pressure of the engine 80 is applied to the fuel vapor system. When a prescribed negative pressure is formed in the fuel vapor system, the first switching valve 12 is closed. At the time when the switching valve 12 is closed and at a subsequent time point at which a prescribed time period has elapsed therefrom, the internal pressure of the fuel tank 2 is detected by the pressure sensor 17. The controller 90 judges that no evaporative fuel leakage takes place in the fuel system if a pressure change acquired from both the detected pressures is smaller than a prescribed value, while it judges that the leakage of evaporative pressure occurs in the fuel system if the pressure change is larger than the prescribed value.

As mentioned above, the second switching valve 15 is fully closed in failure diagnosis, and hence the failure diagnosis accuracy will not deteriorate due to negative pressure leakage through the switching valve 15.

Next, a fuel evaporative emission treatment system according to a second embodiment of the present invention will be explained.

Figure 3:
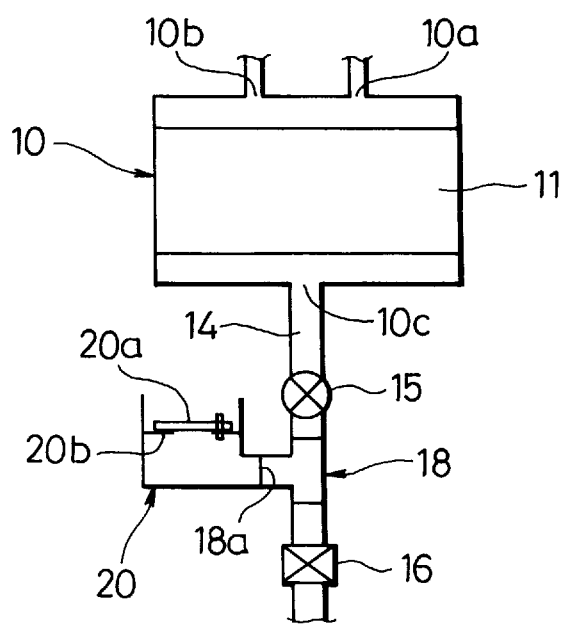
FIG. 3 is a fragmentary view showing an essential part of the fuel evaporative emission treatment system according to a second embodiment of the present invention.

In the system of this embodiment, a lead valve 20 shown in FIG. 3 is used instead of the one-way valve 19 shown in FIGS. 1 and 2. The other constitution of this embodiment is the same as that in the first embodiment. Like elements are shown by like numerals in FIGS. 2 and 3 (The same applies to the embodiments mentioned later).

Referring to FIG. 3, the lead valve 20 has a valve plug 20a formed by a soft rubber plate, for example. The second passage is formed inside the three-way joint 18 and the lead valve 20. One end of the second passage communicates to the first passage, which is defined by the vent pipe 14, between the second switching valve 15 and the air filter 16. The valve plug 20a of the lead valve 20 is constituted so that when an extremely small positive pressure is generated in the vent pipe 14, it is pushed up from a valve seat 20b receiving the positive pressure. When the valve plug 20a is pushed up from the valve seat 20b, the lead valve 20 is opened.

Operation of the system of this embodiment is almost the same as that of the first embodiment, and hence an explanation therefor will be omitted.

A fuel evaporative emission treatment system according to a third embodiment of the present invention will be explained below.

The system of this embodiment uses a diaphragm type one-way valve instead of the float type one-way valve 19 shown in FIG. 2.

Figure 4:
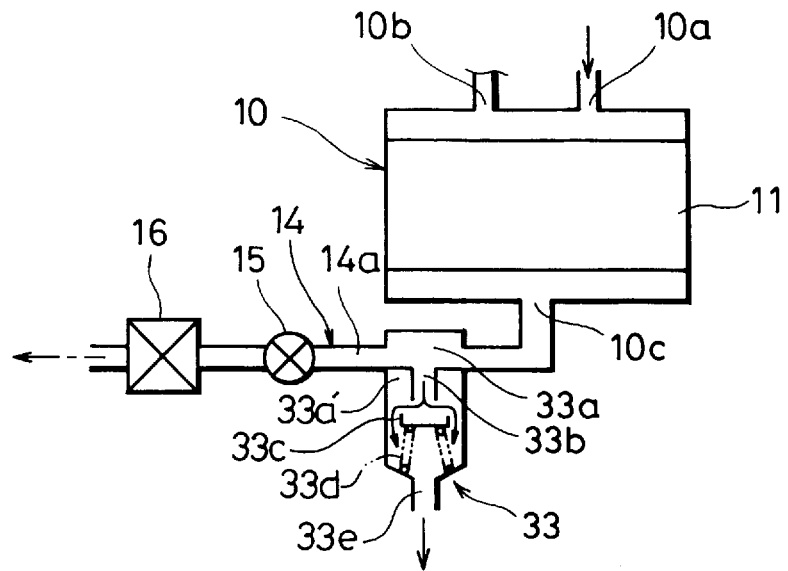
FIG. 4 is a fragmentary view showing an essential part of the fuel evaporative emission treatment system according to a third embodiment of the present invention.

As shown in FIG. 4, a one-way valve 33 defines a second passage 33a, 33a' communicating to the first passage 14a on the canister 10 side with respect to the switching valve 15. The one-way valve 33 has a diaphragm type valve plug 33c adapted to be seated on an outlet port 33b of the passage 33a, a spring 33d for always urging the valve plug 33c to the outlet port 33b side, and a port 33e which opens to the atmosphere.

The one-way valve 33 is so arranged that the valve plug 33c is caused to open against a spring force of the spring 33d when a positive pressure is generated in the first passage 14a. A valve-opening pressure of the valve 33 is set at an extremely low value. For example, in a case where a gas flows in the vent pipe 14 at the flow rate of 50 liter per minute, the valve-opening pressure is about 20 mmAg at the maximum. When a negative pressure is generated in the first passage 14a, the one-way valve 33 is closed by a spring force of the spring 33d and the atmospheric pressure.

Operation of the system of this embodiment is almost the same as those of the first and second embodiments. A brief explanation will be given below. When a gas, which does not contains fuel component, flows out from the canister 10 into the first passage 14a at fueling so that a positive pressure is generated in the first passage 14a, the one-way valve 33 is opened. As a result, the great majority of the gas flown into the first passage 14a is emitted to the atmosphere from the port 33e of the one-way valve 33, as shown by an arrow in FIG. 4. Thus, at fueling, gas from the canister 10 can be emitted into the atmosphere without receiving passage resistance in the switching valve 15 and the air filter 16, whereby the fueling performance is improved.

Figure 5:
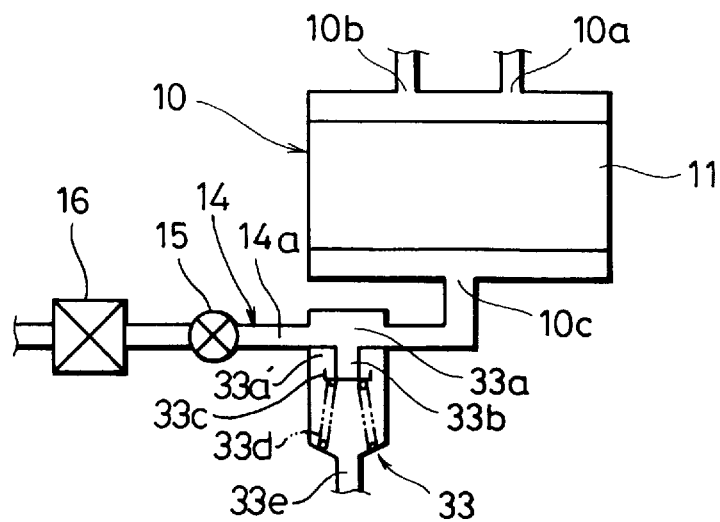
FIG. 5 is a fragmentary view showing the essential part of the system shown in FIG. 4 with a one-way valve closed.

When a negative pressure acts on the canister 10, a negative pressure is generated in the first passage 14a. In this case, as shown in FIG. 5, the valve 33c of the one-way valve 33 receives the atmospheric pressure and a spring force of the spring 33d, and closes the port 18a. That is, the valve 33 is closed to shut off communication between the vent port 10c of the canister 10 and the atmosphere through the second passage 33a, 33a'.

During operation of the engine, an intake negative pressure acts on the canister 10, and purge air flows into the canister 10 through the vent pipe 14 provided with the air filter 16 and the switching valve 15. At this time, since the internal pressure of the vent pipe 14 is smaller than the atmospheric pressure, the one-way valve 33 is closed. During leakage check of the fuel system, the one-way valve 33 is closed since a negative pressure is formed inside the fuel system including the canister 10. That is, this embodiment constructed as mentioned above can provide a leakage check system for the fuel system.

Next, a fuel evaporative emission treatment system according to a fourth embodiment of the present invention will be explained.

Referring to FIG. 6, a vehicle has a body 8 on which the fuel evaporative emission treatment system of this embodiment is mounted. The vehicle body 8 is provided with a chamber (hereinafter referred to as "fuel filler base") 8a having a space for accommodating a part of the filler neck 3 where a filler port 3a is formed. This fuel filler base 8a has a fueling gun insertion port. A seal 22 is provided around the fueling gun insertion port. Further, the fuel filler base 8a is provided with a fuel filler lid 8b which is arranged so as to be opened and closed. The internal space of the fuel filler base 8a is shut off from the outside of the car body 8 when the filler lid 8b is closed.

The fuel evaporative emission treatment system of this embodiment is similar to the first and the second embodiments in that the three-way joint 18 connected to the vent pipe 14 is provided between the second switching valve 15 and the air filter 16. However, as distinct from both the embodiments, a long pipe 21 is connected at one end thereof to the outlet port 18a of the three-way joint 18. The pipe 21 constitutes the second passage forming means together with the three-way joint 18. The three-way joint 18 and the pipe 21 define the second passage 18A, 21A. The other end of the pipe 21 opens to the fuel filler base 8a.

This pipe 21 serves to prevent deterioration of fueling performance due to the provision of the air filter 16. Discharge of gas from the canister into the atmosphere at fueling is achieved with the aid of the pipe 21. Therefore, the passage resistance of the pipe 21 and the passage resistance of the purge pipe 14 on the canister side with respect to the three-way joint 18 need to be made relatively smaller, but the passage resistance of the purge pipe 14 on the side remote from the canister with respect to the three-way joint 18 may be relatively larger.

In this embodiment, the side of the purge pipe 14 remote from the canister is constituted by a pipe 23 having a diameter smaller than that of the pipe 21. In the case that the inner diameter of the pipe 21 is on the order of 15 to 20 mm, the inner diameter of the pipe 23 is made on the order of 8 to 10 mm. Since the passage resistance at the pipe 23 may be relatively larger, the length of the pipe 23 may be longer. Thus, it is unnecessary to install the air filter 16 in the neighborhood of the fuel tank or the canister 10, and hence much freedom is gained in selecting the location of the air filter 16. Also, it is possible to route the pipe 23 so that mud or dust is hard to intrude from its opening end on the atmosphere side.

Operation of the system of this embodiment is basically the same as that of the first to third embodiments. Operation of the system of this embodiment will be explained in brief.

Upon fueling, the switching valve 15 is opened and the fuel filler lid 8b is opened, so that the internal space of the fuel filler base 8a and the passage, 21A in the pipe 21 are communicated to the atmosphere. Passage resistances of the second passage 18A, 21A is smaller than the passage resistance of the first passage 14A at a region downstream of the air filter 16 (inclusive of the filter 16). Thus, the gas whose fuel component was eliminated by the canister 10 is led to the internal space of the fuel fuller base 8a from the vent port 10c through the switching valve 15, the three-way joint 18 and the pipe 21, to be emitted from the space into the atmosphere.

When the fuel filler lid 8b is closed after completion of fueling, the internal space of the fuel filler base 8a is shut off from the outside of the car body 8.

Therefore, inflow of outside air through the passage 21A at the time when an intake negative pressure of the engine acts on the canister 10 can be prevented. In the meantime, the purge air is sucked into the canister 10 through the air filter 16 and so forth.

As mentioned above, the pipe 21 is connected to the purge pipe 14 on the air filter 16 side with respect to the switching valve 15 through the three-way joint 18. Further, the switching valve 15 is closed at leakage check of the fuel system. Thus, the arrangement in which the outward end of the pipe 21 opens into the fuel filler base 8a will not adversely affect leakage check.

In the following, a fuel evaporative emission treatment system according to a fifth embodiment of the present invention will be explained.

Figure 7:
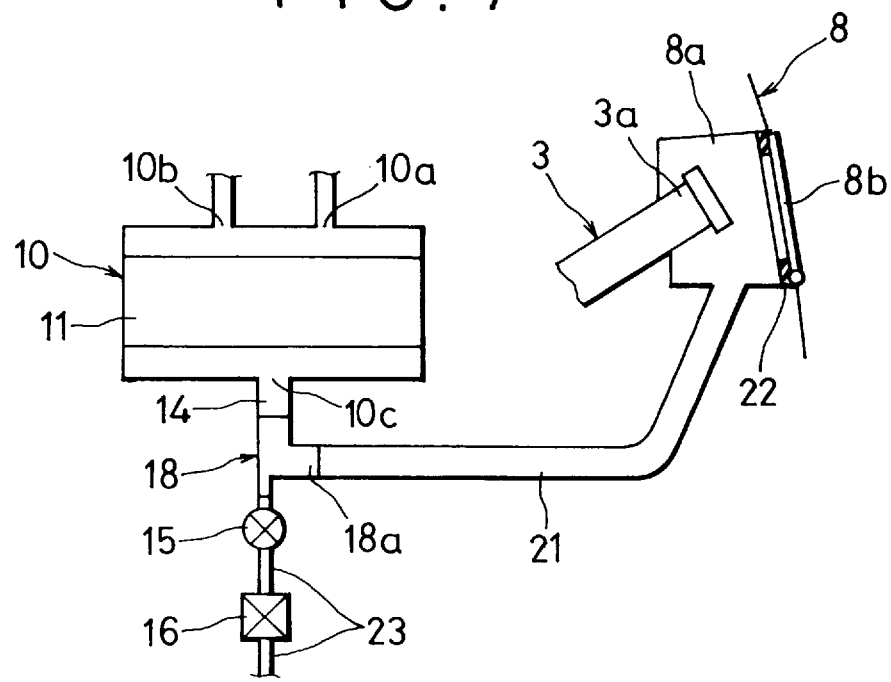
FIG. 7 is a fragmentary view showing an essential part of the system according to a fifth embodiment of the present invention.

The basic constitution of the system of this embodiment is the same as that of the fourth embodiment. However, in this embodiment, as shown in FIG. 7, the pipe 21 is connected through the three-way joint 18 to the purge pipe 14 between the vent port 10c of the canister 10 and the switching valve 15. The side of the purge pipe 14 remote from the canister with respect to the three-way joint 18 is constituted by a pipe 23 which has its diameter smaller than that of the canister side of the purge pipe 14 and than that of the pipe 21. Thus, the switching valve 15 is smaller in size than that of the fourth embodiment, by which cost reduction and improvement in freedom of layout of the air filter 16 can be achieved.

Operation of the system of this embodiment will be explained in brief. At leakage check of the fuel system, the fuel filler lid 8b is closed, so that the internal space of the fuel filler base 8a is shut off from the outside of the vehicle body 8. Thus, inflow of atmosphere into the pipe 21 through the fuel filler base 8a during the leakage check can be prevented.

A fuel evaporative emission treatment system according to a sixth embodiment of the present invention will be explained.

Figure 8:
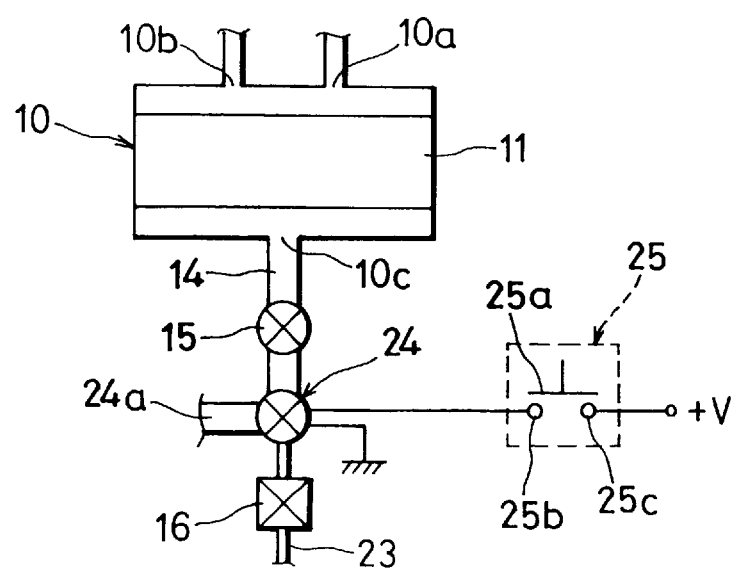
FIG. 8 is a fragmentary view showing an essential part of the system according to a sixth embodiment of the present invention.

As shown in FIG. 8, the fuel evaporative emission treatment system of this embodiment has a three-way switching solenoid valve 24 provided on the purge pipe 14 between the switching valve 15 and the air filter 16, and a judging means 25 for judging whether fueling is being done or not.

The judging means 25 is constituted, for example, by a switch which responds to the opening and closing of the fuel filler lid (corresponding to the element 8b in FIG. 6). The switch 25 has a movable contact 25a and fixed contacts 25b and 25c. At fueling for which the fuel filler lid is opened, the movable contact 25a is connected to the fixed contacts 25b and 25c, so that the switch 25 is turned on. In the meantime, at non-fueling at which the fuel filler lid is closed, connection between the movable contact 25a and the fixed contacts 25b and 25c is shut off, so that the switch 25 is turned off.

Alternatively, the switch 25 may be so designed as to be turned on when the filler cap of the filler neck is opened, or when the fueling gun is inserted into the filler port.

In this embodiment, as with the fourth embodiment, the length of the pipe 23 can be made longer. Thus, the degree of freedom in selecting the location of the air filter 16 is improved. For example, the opening ends on the atmospheric side of the filter 16 and the pipe 23 can be arranged at locations where mud or dust is hard to intrude.

Operation of the fuel evaporative emission treatment system having the above-mentioned constitution will be explained in brief. The switch 25 is turned off at non-fueling. In this case, the three-way switching solenoid valve 24 is deenergized, so that an atmospheric port 24a of the solenoid valve is closed. On the other hand, at fueling, the switch 25 is turned on, and the solenoid valve 24 is energized. In this case, the atmospheric port 24a of the solenoid valve 24 is opened, and the gas flowing out of the vent port 10c of the canister 10 into the purge pipe 14 is emitted into the atmosphere through the atmospheric port 24a.

A fuel evaporative emission treatment system according to a seventh embodiment of the present invention will be explained.

Figure 9:
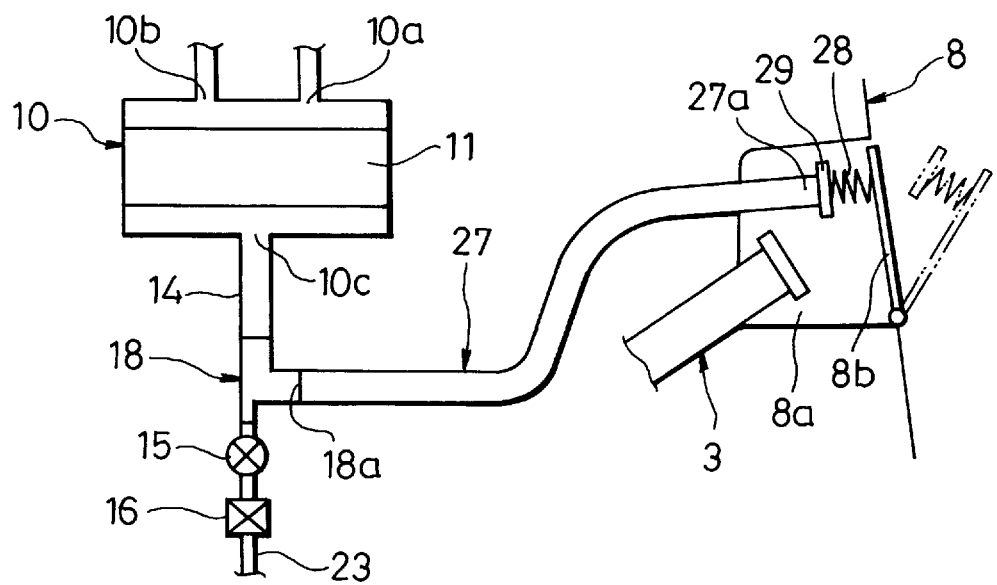
FIG. 9 is a fragmentary view showing an essential part of the system according to a seventh embodiment of the present invention.

The basic constitution of the system of this embodiment is the same as that of the fifth embodiment a (FIG. 7). That is, as shown in FIG. 9, in the fuel evaporative emission treatment system of this embodiment, one end of a pipe 27 (corresponding to the pipe 21 shown in FIG. 7) is connected through the three-way joint 18 to the vent pipe 14 between the vent port 10c of the canister 10 and the switching valve 15. The other end 27a of the pipe 27 opens into the internal space of the fuel filler base 8a of the vehicle body 8.

As distinct from the system shown in FIG. 7, in this embodiment, the opening end 27a of the pipe 27 is arranged to face the fuel filler lid 8b. The filler lid 8b is provided with a cap (valve) 29 through a spring 28.

Operation of the system constructed as mentioned above will be explained in brief.

At fueling for which the fuel filler lid 8b is opened, the cap 29 is, as shown by the two-dot chain line in FIG. 9, moved integrally with the filler lid 8b in the direction away from the opening end 27a of the pipe 27. Thus, the internal passage of the pipe 27 communicates to the internal space of the filler base 8a. As a result, the gas flowing out of the vent port 10c of the canister 10 into the vent pipe 14 is emitted into the atmosphere through the pipe 27 and the internal space of the filler base 8a.

When fueling is completed and the fuel filler lid 8b is closed as shown by the solid line in FIG. 9, the cap 29 is pressed into contact with the opening end 27a of the pipe 27 by a spring force of the spring 28 to completely close the opening end 27a. Thus, even if a negative pressure is generated in the pipe 27 caused by the intake negative pressure on the canister 10 during engine operation, air inflow through the opening end 27a of the pipe 27 can be prevented. In the meantime, the purge air is sucked from the air filter 16.

During the leakage check for the fuel system, since the opening end 27a of the pipe 27 is completely and tightly closed, gas-tightness of the fuel evaporative emission treatment system is maintained.

A fuel evaporative emission treatment system according to an eighth embodiment of the present invention will be explained.

Figure 10:
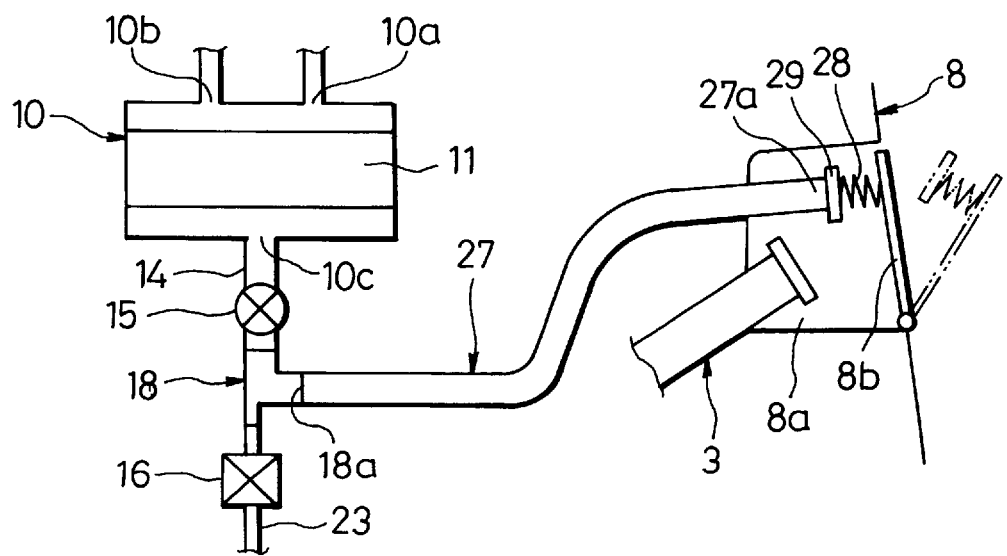
FIG. 10 is a fragmentary view showing an essential part of the system according to an eighth embodiment of the present invention.

The system of this embodiment is provided with features of the fourth preferred embodiment (FIG. 6) and features of the seventh embodiment (FIG. 9). That is, as shown in FIG. 10, in the system of this embodiment, one end of the pipe 27 (corresponding to the pipe 21 in FIG. 6) is connected through the three-way to the purge pipe 14 joint 18 between the switching valve 15 and the air filter 16. The other end 27a of the pipe 27 opens in the internal space of the fuel filler base 8a, and is adapted to be opened and closed by the cap (valve) 29 provided on the filler lid 8b.

Therefore, even if the opening end 27a of the pipe 27 is not completely and tightly closed by the cap 29, communication between the vent port 19c side of the canister and the atmosphere through the pipe 27 can be completely shut off by closing the switching valve 15. Thus, the constitution that the pipe 27 is connected to the vent pipe 14 will not adversely affect the gas-tightness of the fuel evaporative emission treatment system at leakage check of the fuel system.

Next, a fuel evaporative emission treatment system according to a ninth embodiment of the present invention will be explained.

The system of this embodiment is the same in its basic constitution as that of the seventh embodiment (FIG. 9), but different from the seventh embodiment in that the opening end 27a of the pipe 27 opens to the neighborhood of the filler port of the filler neck.

Figure 11:
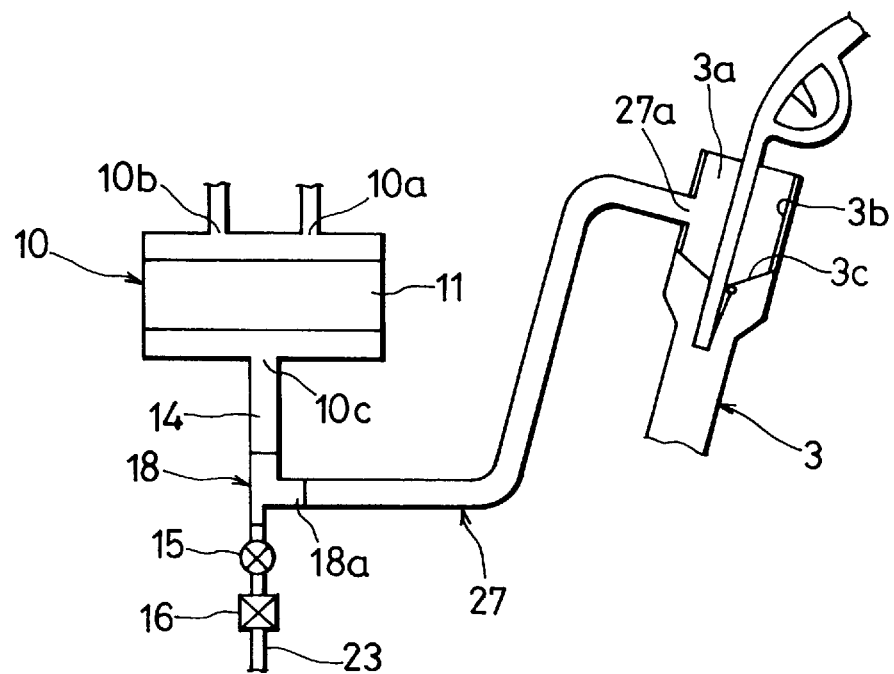
FIG. 11 is a fragmentary view showing an essential part of the system according to a ninth embodiment of the present invention.
Figure 12:
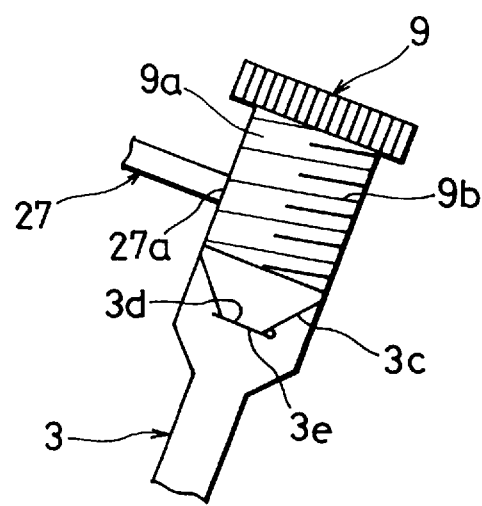
FIG. 12 is a partially enlarged view showing the filler neck shown in FIG. 11 with a filler cap attached.

Referring to FIG. 11, the filler neck 3 is provided with a restrictor 3c. A thread 3b is formed on the inner circumferential face of the filler neck 3 on the filler port 3a side with respect to the restrictor 3c. The opening end 27a of the pipe 27 opens to the inner circumferential face of the filler neck 3 almost in the middle between the filler port 3a and the restrictor 3c in the axial direction of the filler neck 3. As shown in FIG. 12, the filler cap 9 has a barrel part 9a which is slightly smaller in length than the distance between the filler port 3a and the restrictor 3c. A threaded part 9b adapted to be threadedly engaged with the thread 3b of the filler neck 3 is provided on the outer circumferential face of the barrel part 9a. In FIG. 12, reference numeral 3d denotes to a fueling gun insertion port formed on the restrictor 3c, and reference numeral 3e refers to a valve for opening and closing the fueling gun insertion port 3d.

Operation of the fuel evaporative emission treatment system having the above constitution will be explained in brief.

At non-fueling at which the filler cap 9 is attached to the filler port 3a, the opening end 27a of the pipe 27 is closed by the barrel part 9a of the filler cap 9, as shown in FIG. 12. Thus, even if the valve 3e is opened due to some cause during turning of the vehicle, fuel in the fuel tank is prevented from flowing into the canister through the filler neck 3 and the pipe 27.

When the filler cap 9 is removed from the filler neck 3 at fueling, the opening end 27a of the pipe 27 communicates to the internal space of the filler neck 3. As a result, the gas (air) flowing out of the canister 10 into the vent pipe 14 is emitted into the atmosphere from the filler port 3a of the filler neck 3 through the vent pipe 14.

A fuel evaporative emission treatment system according to a tenth embodiment of the present invention will be explained.

The system of this embodiment is basically the same as that of the ninth embodiment (FIGS. 11 and 12) in its constitution, while it is different from the ninth embodiment in an opening and closing mechanism of the opening end 27a of the pipe 27.

Figure 13:
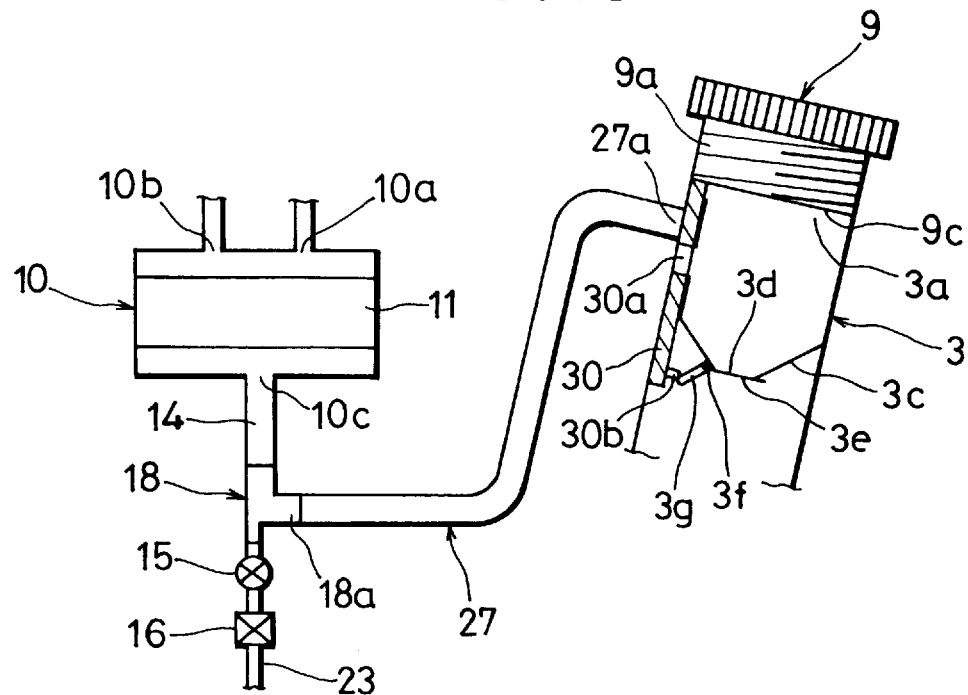
FIG. 13 is a fragmentary view showing an essential part of the fuel evaporative emission treatment system of a tenth embodiment of the present invention.

Referring to FIG. 13, the filler neck 3 is provided with the restrictor 3c. The fueling gun insertion port 3d of the restrictor 3c is opened and closed by the valve 3e arranged rotatably around a rotation shaft 3f. Reference numeral 3g refers to a rotating piece adapted to rotate around the rotation shaft 3f with rotation of the valve 3e.

The opening end 27a of the pipe 27 opens to the inner circumferential face of the filler neck 3 almost in the middle between the filler port 3a and the restrictor 3c in the axial direction of the filler neck 3. A thread is formed on the inner circumferential face of the filler neck 3 on the side close to the filler port 3a with respect to the pipe opening end 27a. The barrel part 9a of the filler cap 9 has a length smaller than the distance between the filler port 3a and the pipe opening 27a. A thread, which is formed on the outer circumferential face of the barrel part 9a, is threadedly engaged with the thread formed on the inner circumference of the filler neck.

Reference numeral 30 refers to a shutter which is arranged air-tightly on the filler neck inner circumferential face. A hole 30a is pierced in the middle part of the shutter 30, and a protrusion 30b adapted to be engaged with the rotation piece 3g is provided at the lower end of the shutter 30. This shutter 30 is urged by the rotation piece 3g which rotates in response to the opening and closing action of the valve 3e, and slides along the filler-neck inner circumferential face between the lower limit position shown in FIG. 13 and the upper limit position shown in FIG. 14.

In the above constitution, when the filler cap 9 is attached on the filler port 3a, the valve 3e closes the fueling gun insertion port 3d with its spring force. The shutter 30 is lowered to the lower limit position shown in FIG. 13 by its own weight or by being pushed by a lower end 9c of the filler cap 9, and is maintained at this lower limit position by the cap lower end 9c. When the shutter 30 is at the lower limit position, the opening end 27a of the pipe 27 is closed by the shutter 30. As a result, communication between the pipe 27 internal space and the internal space of the filler neck 3 is completely shut off, by which the evaporative fuel in the filler neck 3 is prevented from flowing out to the atmosphere through the pipe 27, the switching valve 15 and the filter 16.

Figure 14:
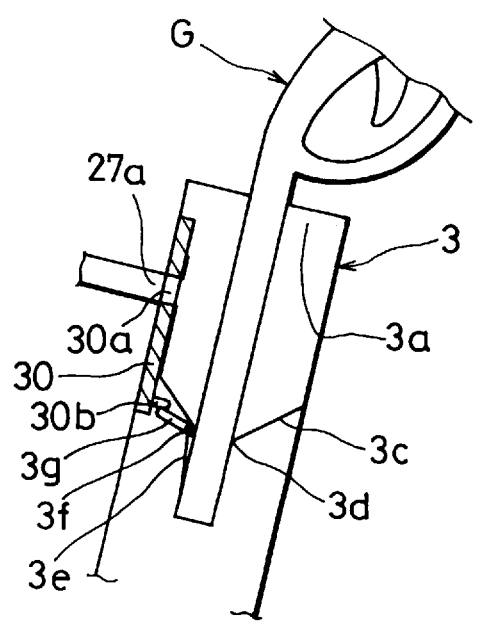
FIG. 14 is a fragmentary view showing the filler neck shown in FIG. 13 with a fueling gun inserted.

At fueling, the filler cap 9 is removed from the filler port, as shown in FIG. 14, and then a fueling gun G is inserted into the fueling gun insertion port 3d through the filler port 3a. As a result, the valve 3e is pushed by the fueling gun G to be rotated around the rotation shaft 3f, and hence the shutter 30 is pushed up to the upper limit position by the rotation piece 3g through the protrusion 30b. When the shutter 30 is at the upper limit position, the hole 30a provided in the shutter 30 is aligned with the pipe opening end 27a. As a result, the internal space of the pipe 27 communicates to the internal space of the filler neck 3. Thus, the gas flowing into the vent pipe 14 from the canister 10 is emitted into the atmosphere from the filler port 3a of the filler neck 3 through the pipe 27.

The present invention is not limited to the foregoing first to tenth embodiments, but may have many variations.

For example, in the first and second embodiments, the one-way valve 19 and the lead valve 20 are connected to the vent pipe 14 between the switching valve 15 and the air filter 16, but the valve 19 or 20 may be connected to the vent pipe 14 on the canister 10 side with respect to the switching valve 15, if connection of the one-way valve 19 or the lead valve 20 to the vent pipe 14 on the canister 10 side with respect to the switching valve 15 does not adversely affect gas-tightness at leakage check of the fuel system.

Figure 15:
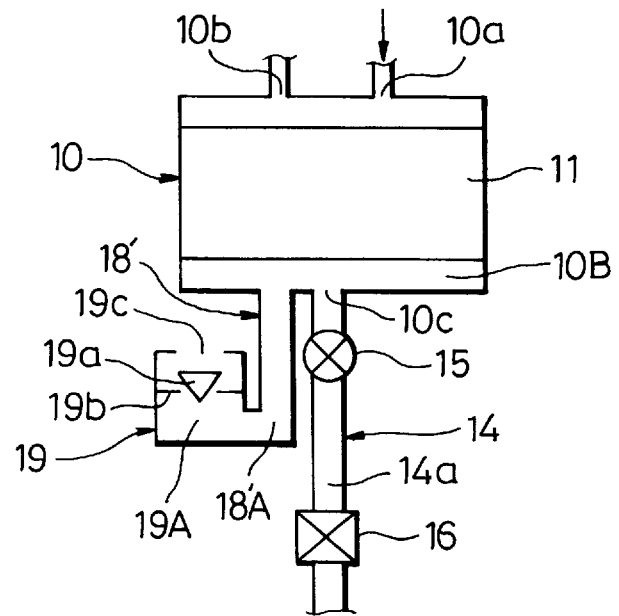
FIG. 15 is a fragmentary view showing a variation of the first embodiment with the first passage connected directly to the vent part of the canister.
Figure 17:
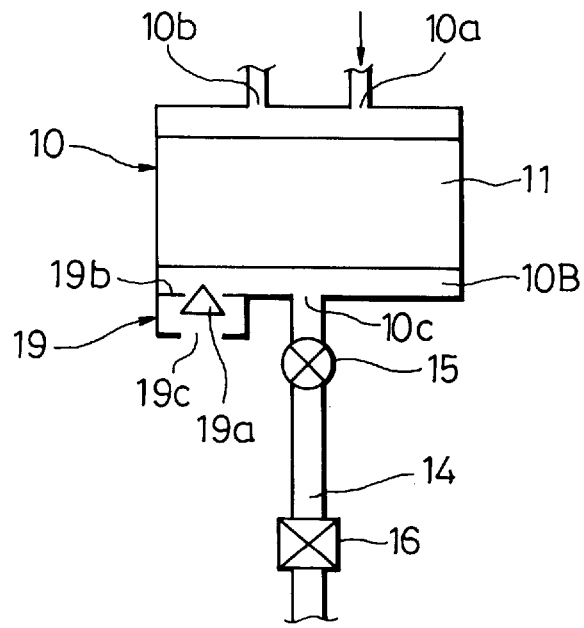
FIG. 17 is a fragmentary view showing a variation of the first embodiment with the one-way valve provided at the vent part.
Figure 18:
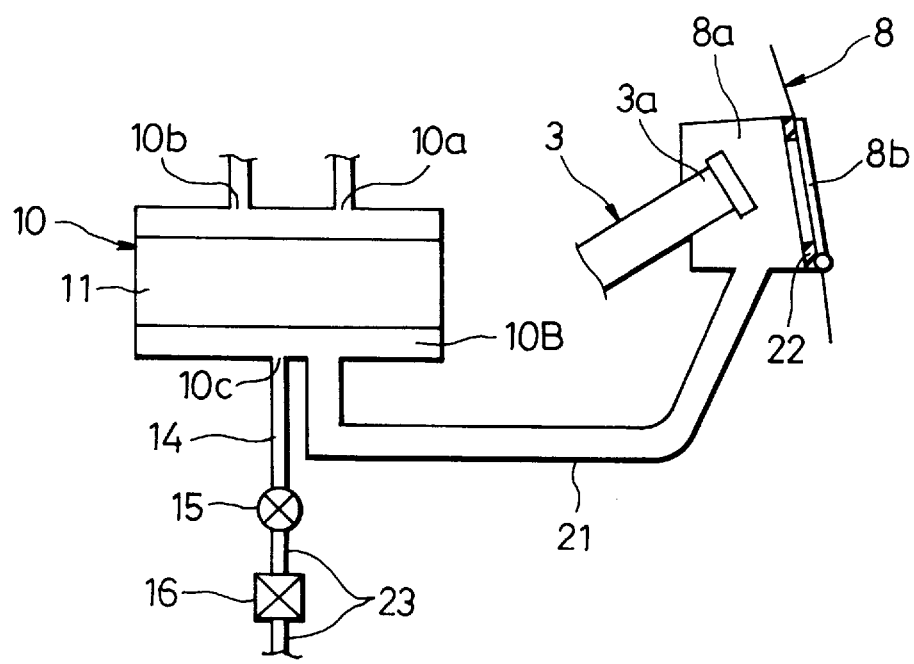
FIG. 18 is a fragmentary view showing a variation similar to that in FIG. 15 of the fifth embodiment.
Figure 19:
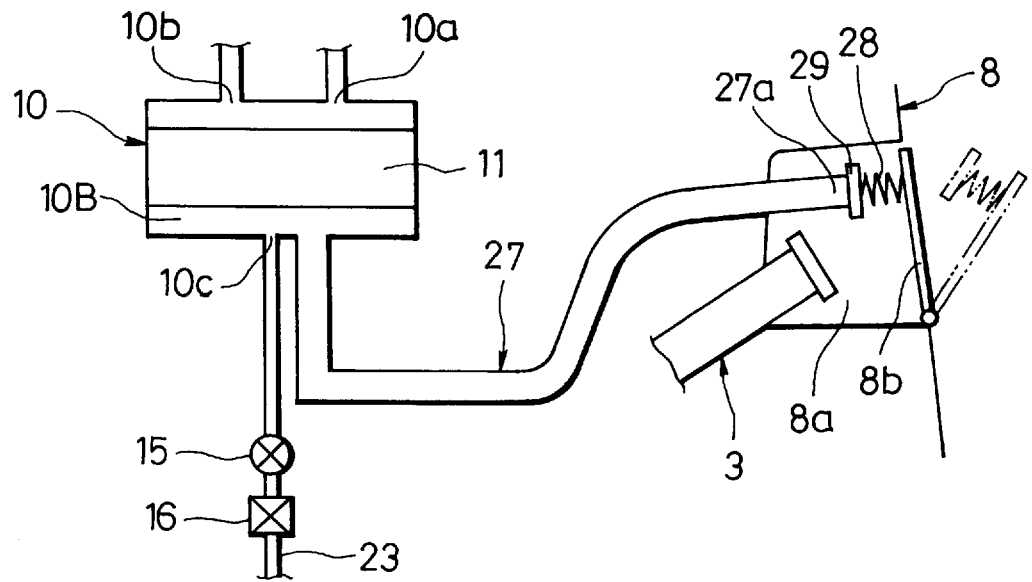
FIG. 19 is a fragmentary view showing a variation similar to that in FIG. 15 of the seventh embodiment.
Figure 20:
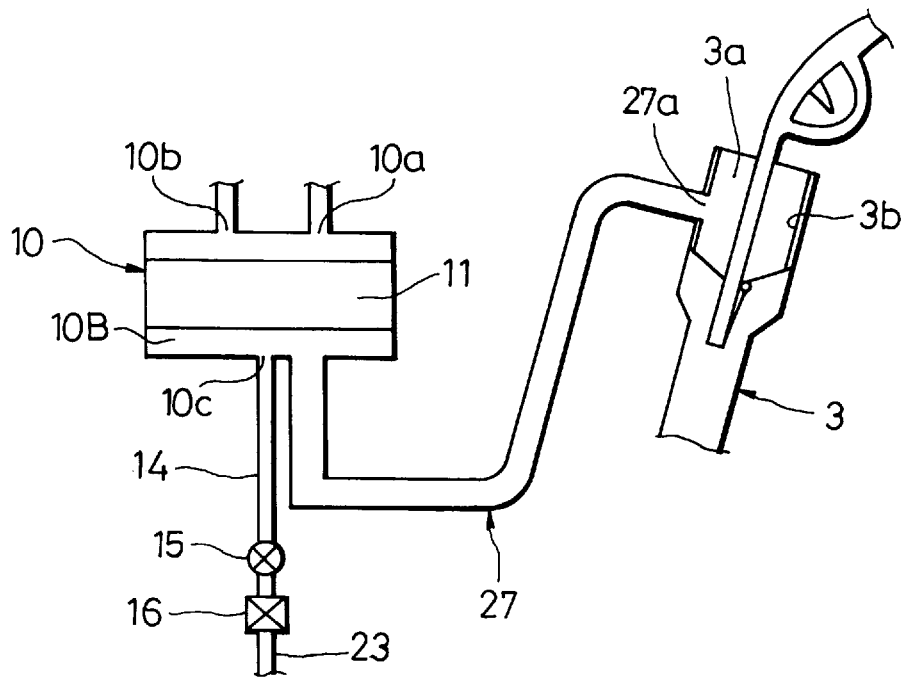
FIG. 20 is a fragmentary view showing a variation similar to that in FIG. 15 of the ninth embodiment.
Figure 21:
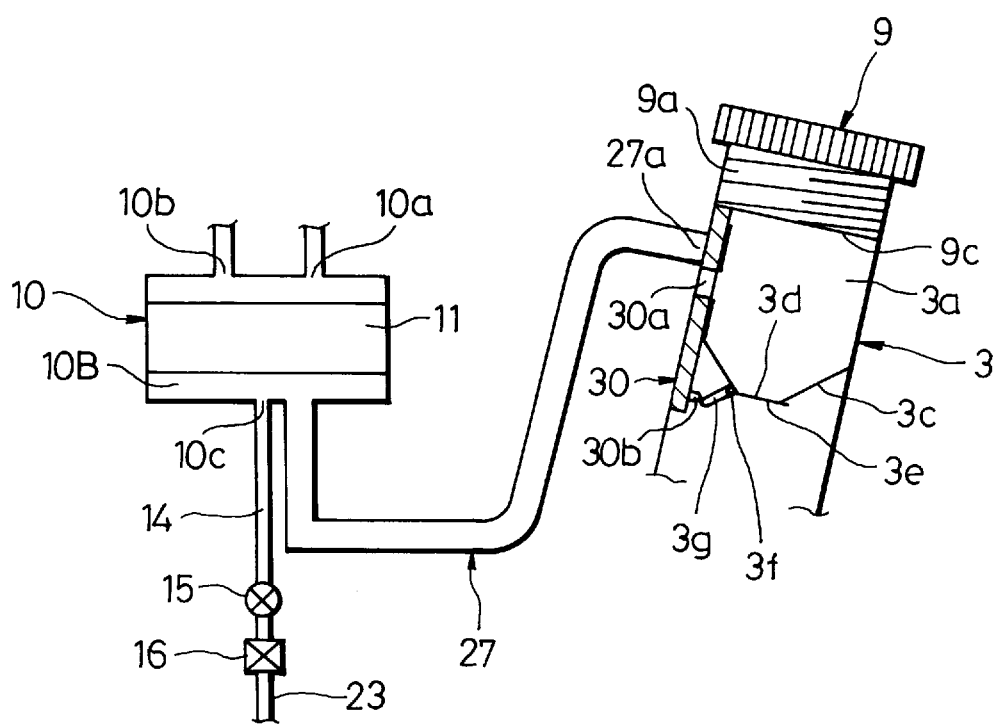
FIG. 21 is a fragmentary view showing a variation similar to that in FIG. 15 of the tenth embodiment.

In the first to tenth embodiments, the second passage shown, by way of example, by reference numerals 18A and 19A in FIG. 2, are connected to the vent part 10B of the canister 10 through the first passage shown by reference numeral 14a in FIG. 2, but the second passage may be directly connected to the vent part. Such variations are shown in FIG. 15 and FIGS. 17 to 21. FIGS. 15 and 17 show variations of the first embodiment, while FIGS. 18, 19, 20 and 21 show variations of the fifth, seventh, ninth and tenth embodiments.

In FIG. 15, the inlet port of the one-way valve (second switching means) is connected to the vent part 10B through a short pipe 18'. Thus, the second passage 18'A, 19A defined by the pipe 18' and the valve 19 directly communicates to the vent part 10B. In FIG. 17, the one-way valve 19 is directly provided at the vent part 10B. That is, the valve seat 19b of the one-way valve 19 is formed at the casing of the canister 10. Also, a hole formed on the valve seat 19b (casing of the canister 10) with which the tip end of the valve plug 19a is removably engaged constitutes a part of the second passage. The one-way valve 19 shown in FIGS. 15 and 17 is opened when a slight positive pressure is generated in the canister 10 at fueling.

In FIGS. 18 to 21, one end of the pipe 21 or 27 which defines the second passage is directly connected to the vent part 10B. The cross sectional area of the second passage is larger than that of the first passage defined by the vent pipe 14.

Figure 16:
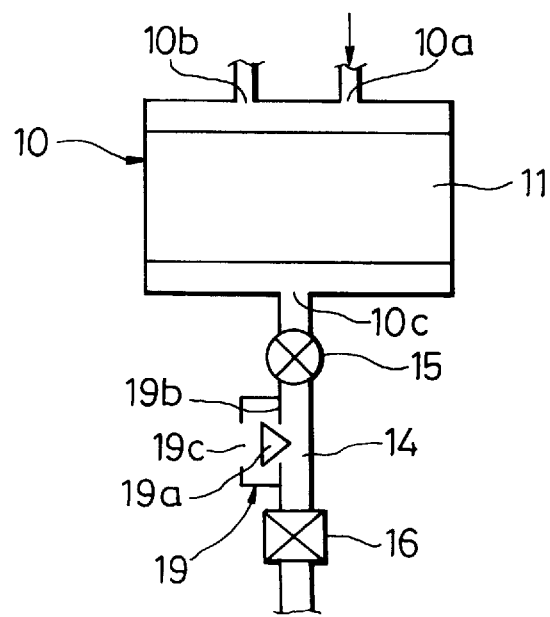
FIG. 16 is a fragmentary view showing a variation of the first embodiment with the one-way valve connected directly to the vent pipe.

Further, in the first and second embodiments, the one-way valve 19 and the lead valve 20 are connected to the vent pipe 14 respectively through the three-way joint 18, but the valves 19 and 20 may be directly connected to the vent pipe 14. FIG. 16 shows such a variation of the first embodiment. In FIG. 16, the valve seat 19b of the one-way valve 19 is formed on the circumferential wall of the vent pipe 14. A hole which is formed in the valve seat 19b (circumferential wall of the vent pipe 14) and with which the tip end of the valve 19a is removably engaged constitutes a part of the second passage.

What is claimed is:

1. A fuel evaporative emission treatment system, comprising:
   a canister for absorbing evaporative fuel, said canister having an evaporative fuel introduction part in communication with a fuel tank through a vent hose, an evaporative fuel emission part in communication with an intake system of an engine, and a vent part;
   a first passage forming means having a first passage, a first end of said first passage being in communication with said vent part of said canister and a second end of said first passage being open to an external atmosphere;
   a first switching means, provided between said first and second ends of said first passage, for opening and closing said first passage;
   a filter provided in said first passage between said first switching means and said second end of said first passage, such that said filter cleans atmospheric air flowing in from said second end of said first passage towards said canister;
   a second passage forming means having a second passage, a first end of said second passage being in fluid communication with said vent part of said canister and a second end of said second passage being in communication with the external atmosphere; and
   a second switching means, provided in said second passage, for opening and closing said second passage.

2. A fuel evaporative emission treatment system according to claim 1, wherein said first end of said second passage communicates to said first passage between said first switching means and said filter.

3. A fuel evaporative emission treatment system according to claim 2, wherein said first end of said second passage communicates to said first passage on a side close to said canister with respect to said first switching means.

4. A fuel evaporative emission treatment system according to claim 2, wherein said first end of said second passage opens to said vent part of said canister.

5. A fuel evaporative emission treatment system according to claim 1, wherein said second switching means is a one-way valve which opens said second passage when a positive internal pressure is generated in said first passage or in said canister upon generation of a pressure attributable to fueling to said fuel tank.

6. A fuel evaporative emission treatment system according to claim 1, wherein said second switching means is a lead valve which opens said second passage when a positive internal pressure is generated in said first passage or in said canister upon generation of a pressure attributable to fueling to said fuel tank.

7. A fuel evaporative emission treatment system according to claim 1, wherein said system is mounted on a vehicle having a fuel filler base with a space for accommodating a filler-port-formed portion of a filler neck of said fuel tank; and
   said second passage has another end which opens to said space of said fuel filler base.

8. A fuel evaporative emission treatment system according to claim 7, wherein said fuel filler base has a fueling gun insertion port; and
   said second switching means is a fuel filler lid provided on said fuel filler base so as to be opened and closed, said fuel filler lid tightly closing said fueling gun insertion port of said fuel filler base when said fuel filler lid is closed.

9. A fuel evaporative emission treatment system according to claim 7, wherein said fuel filler base is provided with a fuel filler lid which is adapted to be opened and closed; and
   said second switching means is a lid member provided on said fuel filler lid, said lid member tightly closing said another end of said second passage when said fuel filler lid is closed.

10. A fuel evaporative emission treatment system according to claim 1, wherein said fuel tank has a filler neck with a filler port; and
   said second passage has another end which opens to a neighborhood of said filler port of said filler neck.

11. A fuel evaporative emission treatment system according to claim 10, wherein said second switching means is a filler cap removably mounted on said filler port, said filler cap closing said another end of said second passage when said filler cap is mounted on said filler port.

12. A fuel evaporative emission treatment system according to claim 10, wherein said second switching means is a shutter for opening and closing said another end of said second passage.

13. A fuel evaporative emission treatment system according to claim 12, wherein said filler neck is provided with a valve for opening and closing a fueling gun insertion port formed on a restrictor provided at said filler port; and said shutter closes said another end of said second passage by being driven by said filler cap when the filler cap is mounted on said filler port, said shutter being driven by said valve to cause said another end of said second passage to open at fueling to said fuel tank for which said filler cap is removed from said filler port.

14. A fuel evaporative emission treatment system according to claim 1, wherein said second switching means is a solenoid valve which is energized to be opened at fueling to said fuel tank.

15. A fuel evaporative emission treatment system according to claim 14, further including:

a judging means for judging whether fueling to said fuel tank is being done or not;

wherein said solenoid valve is energized when said judging means judges that fueling is being done.

16. A fuel evaporative emission treatment system according to claim 1, further including:

a pressure detecting means for detecting an internal pressure of said system on a side remote from said filter with respect to said first switching means or an internal pressure of said fuel tank;

wherein a failure of said fuel evaporative emission treatment system or said fuel tank is determined based on a pressure change detected by said pressure detecting means in a state where said first switching means is closed.

* * * * *